United States Patent [19]

Higashihara

[11] Patent Number: 6,005,490

[45] Date of Patent: *Dec. 21, 1999

[54] BIDIRECTIONAL REMOTE CONTROL APPARATUS

[75] Inventor: Morio Higashihara, Saitama-ken, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/893,541

[22] Filed: Jul. 11, 1997

[30] Foreign Application Priority Data

Jul. 12, 1996 [JP] Japan ................................. 8-183506

[51] Int. Cl.$^6$ ................................................ H04N 5/44
[52] U.S. Cl. .............................. 340/825.72; 340/825.76; 340/825.69; 340/825.34; 348/7; 348/8; 348/12; 348/734; 341/176; 345/169; 345/170
[58] Field of Search .............................. 340/825.72, 825, 340/76, 825.69, 825.34; 348/7, 8, 12, 734; 345/169, 170; 341/176

[56] References Cited

U.S. PATENT DOCUMENTS 4,728,949  3/1988  Platte et al. ..................... 340/825.69

5,410,326  4/1995  Goldstein ........................ 340/825.72

FOREIGN PATENT DOCUMENTS 4-299695  2/1992  Japan .
4-44468  10/1992  Japan .

Primary Examiner—Brian Zimmerman
Assistant Examiner—Yves Dalencourt
Attorney, Agent, or Firm—Pillsbury Madison & Sutro LLP

[57] ABSTRACT

A CPU of controlled equipment generates an operating key information signal indicating operating key(s) to be depressed of a plurality of operating keys in the mode the controlled equipment is currently set, and sends it to a transmitting element. The transmitting element converts the signal into an infrared operating key information signal, and sends it to a remote control transmitter. A receiver of the remote control transmitter receives the infrared operating key information signal from the controlled equipment, converts it into an electric operating key information signal, and sends it to a CPU. The CPU generates a drive control signal which lights LED(s) (Light Emitting Diode(s)) provided on the operating keys specified by the operating key information signal and sends it to a LED driver. The LED driver lights LED(s) of the operating key(s) to be pressed.

6 Claims, 3 Drawing Sheets

BIDIRECTIONAL REMOTE CONTROL APPARATUS

BACKGROUND OF THE INVENTION

1. Field of the Invention

The present invention relates to a bidirectional remote control apparatus which can exchange a control signal between a remote control transmitter and controlled equipment in two directions.

2. Description of the Related Art

In recent years, in the field of home electric apparatus, such as a television receivers, it has become popular to control a main apparatus (e.g.,the television), that is, the controlled equipment, by a remote control transmitter.

In such a conventional remote control apparatus, the controlled equipment increasing because all operations of the controlled equipment are controlled is remotely controlled by a control signal, such as an infrared ray signal transmitted by the remote control transmitter. Therefore, it is necessary for an operator to know which remote control keys should be operated corresponding to a current operating condition of the controlled equipment when the operator controls the controlled equipment.

The number of keys used by the remote control transmitter tends has been increasing because all operations of the controlled equipment are controlled remote control transmitter. Therefore, it is difficult to find the operating key corresponding to the current operation condition of the controlled equipment from among the many operating keys on the remote control transmitter. In addition, in the conventional remote control transmitter, in most cases, all the operating keys are operable regardless of the operating condition of the controlled equipment, resulting in low operability.

SUMMARY OF THE INVENTION

It is an object of the present invention to provide a bidirectional remote control apparatus on which the key(s) needed for an operation can be easily confirmed from among a plurality of operating keys.

A bidirectional remote control apparatus according to the present invention includes controlled equipment and a remote control transmitter for remotely controlling the controlled equipment. This remote control apparatus has a plurality of operating keys on the remote control transmitter, a first transmitting element, provided on the remote control transmitter, which generates a control signal for controlling the controlled equipment in response to the operation of the plurality of operating keys a second transmitting element, provided on the controlled equipment which sends an operating key information signal from the controlled equipment to the remote control transmitter indicating operable operating keys out of the plurality of operating keys in the mode in which the controlled equipment is currently set; and a lighting circuit provided on the remote control transmitter which receives the operating key information signal, and in response to the operating key information signal, lights only the operating keys indicated by the operating key information signal from the controlled equipment.

In such configuration, the transmitting element on the controlled equipment transmits an operating key information signal indicating the keys to be pressed from among the plurality of operating keys in the mode in which the controlled equipment is currently set. The lighting circuit on the remote control transmitter only lights the operating keys indicated by the operating key information signal from the controlled equipment. Therefore, the user can easily confirm the operating keys needed for the operation from among the plurality of operating keys.

A bidirectional remote control apparatus according to the present invention comprises controlled equipment and a remote control transmitter for remotely controlling the controlled equipment. The controlled equipment includes a requesting circuit which requests a response from an operator. This remote control apparatus has a plurality of operating keys provided on the remote control transmitter; a first transmitting element provided on the remote control transmitter, which generates a signal indicating an operator's request for the controlled equipment in response to the operator's operation of the plurality of operating keys; a second transmitting element, provided on the controlled equipment, which sends a key information signal from the controlled equipment to the remote control transmitter indicating the operating keys needed for an operator to respond from among the plurality of operating keys in the mode in which a controlled equipment requests the response from the operator, and a reporting circuit, provided on the remote control transmitter, which receives the key information signal from the controlled equipment, and in response to the key information signal, indicates the operating keys needed for an operator to respond.

In this configuration, the second transmitting element transmits a key information signal indicating the operating keys needed for the operator's response from among the plurality of operating keys in the mode in which the controlled equipment requests that the operator respond. On the other hand, the reporting circuit on the remote control transmitter informs the user of the operating keys indicated by the key information signal from the controlled equipment. Therefore, the user can confirm the operating keys needed for the present operation from among the plurality of operating keys.

In addition, a bidirectional remote control apparatus according to the present invention is equipped with a television receiver and a remote control transmitter. The television receiver can receive television broadcast signals and display a text requesting a response from a TV viewer. By the remote control transmitter, the TV viewer can respond to the text displayed on the TV receiver. In other words, the information can be exchanged between the TV receiver and the remote control transmitter in two directions. Such a remote control apparatus includes characterized a plurality of operating keys provided on the remote control transmitter; a first transmitting element provided on the remote control transmitter, which generates a control signal for controlling the TV receiver or an answer signal indicating a viewer's response in response to operation of the plurality of operating keys a second transmitting element, provided on the TV receiver, which transmits a key information signal from the TV receiver to the remote control transmitter while the text is being displayed on the TV receiver and transmits a key information signal indicating the operating keys needed for a viewer to respond from among the plurality of operating keys; and a lighting circuit, provided on the remote control transmitter, which receives the key information signal from the TV receiver, and, in response to the key information signal, indicates the operating keys needed for a viewer to respond.

In this configuration, when the TV receiver is the controlled equipment, and it is necessary for a TV viewer to answer a question, such as a quiz, a text for requesting a response from the TV viewer (i.e., a question) is displayed on the screen and the operating keys required for the present operation are lit. Therefore, the user knows the contents of a response and can easily find the operating keys required to respond.

DETAILED DESCRIPTION OF THE CURRENTLY PREFERRED EMBODIMENTS

One embodiment of the present invention will be described below with reference to the appended drawings.

Figure 1:
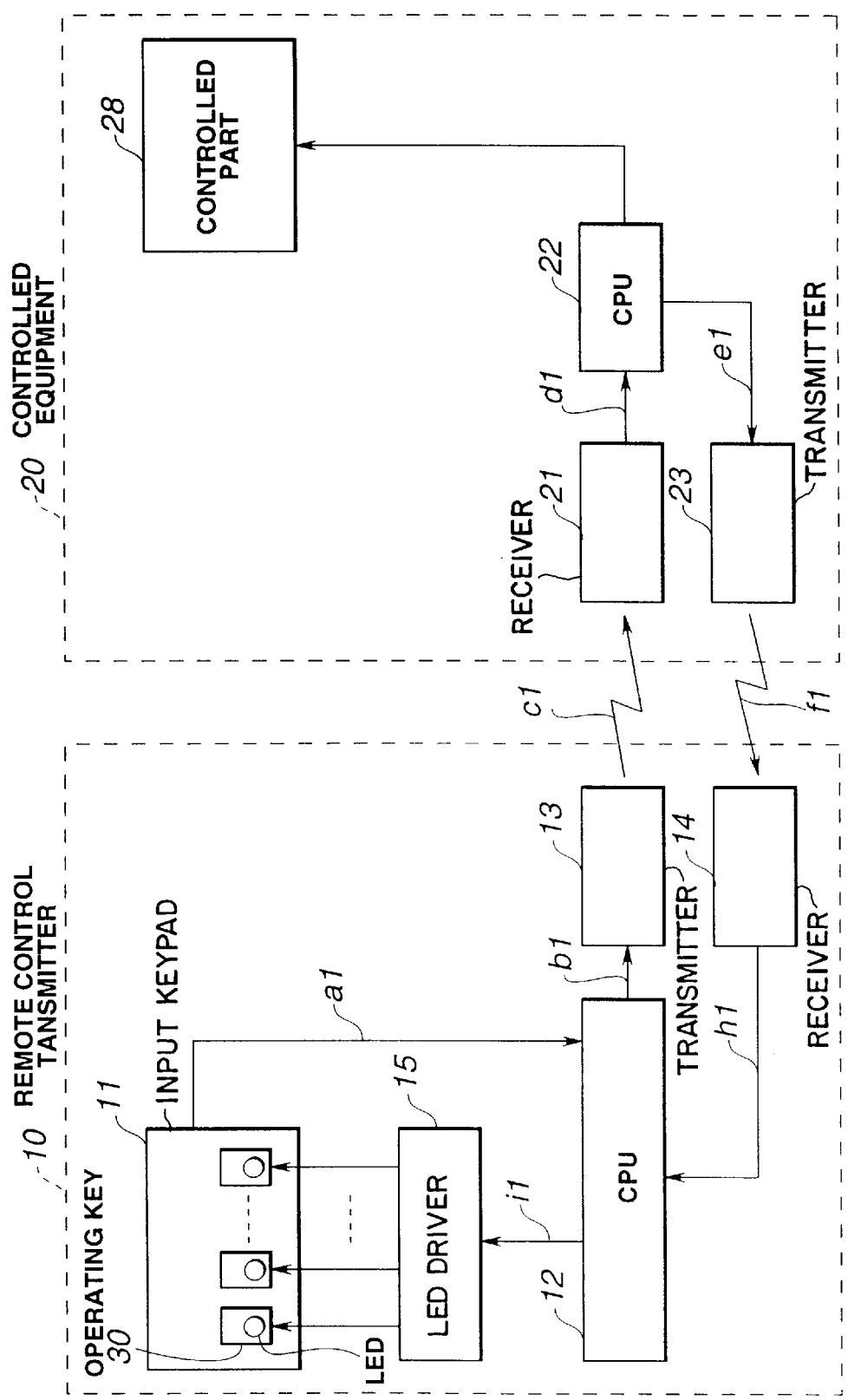
FIG. 1 is a circuit block diagram showing a bidirectional remote control apparatus of one embodiment of the present invention.

FIG. 1 is a circuit block diagram of one embodiment of a bidirectional remote control apparatus according to the present invention.

In FIG. 1, the remote control transmitter 10 remotely controls the controlled equipment 20, which is the main apparatus.

The remote control transmitter 10 comprises a input keypad 11, a central processing unit (CPU) 12, a transmitter 13, a receiver 14, and a light emitting diode (LED) drivier 15.

The input keypad 11 is installed on the remote control transmitter 10 and equipped with a plurality of operating keys 30. A control signal is selected by pressing one of the operating keys 30. A key input signal al by such key operation is sent to the CPU 12. The CPU 12 detects the key input signal al from the input keypad 11. The detected result is converted into an electric control signal b1 and sent to the transmitter 13. The transmitter 13 converts the control signal b1 from the CPU 12 into an infrared control signal c1 and sends it to the controlled equipment 20. The transmitter 13 generates an infrared control signal c1 for controlling the controlled equipment 20 in response to the operation of the plurality of operating keys 30.

On the other hand, the receiver 14 of the remote control transmitter 10 receives the infrared operating key information signal f1 from the controlled equipment 20, converts it into an electric operating key information signal h1, and sends it to the CPU 12. The CPU 12 generates a drive control signal i1 which lights the LED(s) specified by the operating key information signal h1 on certain operating key(s) and sends it to the LED driver 15.

The LED driver 15 lights the LED(s) of the operating key(s) required for the present operation out of a plurality of operating keys 30 in accordance with the drive control signal i1.

The controlled equipment 20 is an interactive TV receiver, for example, comprising a receiver 21, a CPU 22, a transmitter 23, and a controlled part 28.

The receiver 21 receives the infrared control signal c1 from the remote control transmitter 10, converts it into a electric control signal d1, and sends it to the CPU 22.

The CPU 22 decodes the control signal d1 and controls the controlled part 28 in the controlled equipment 20 according to the decoded control data.

The CPU 22 generates an operating key information signal e1 indicating the operating keys to be pressed from among a plurality of operating keys 30 of the input keypad 11 in the predetermined mode or in the mode set by the above-mentioned decoded control data, and sends it to a transmitter 23. The transmitter 23 converts the operating key information signal e1 from the CPU 22 into the infrared operating key information signal f1 and sends it to the remote control transmitter 10.

In such configuration, the receiver 14, the CPU 12, the LED driver 15 and the LEDs are mounted on the remote control transmitter 10. They constitute a reporting circuit or a lighting circuit which receives the operating key information signal f1 from the transmitter 23 of the controlled equipment and indicates or lights the operating keys specified by the operating key information signal f1.

Figure 2:
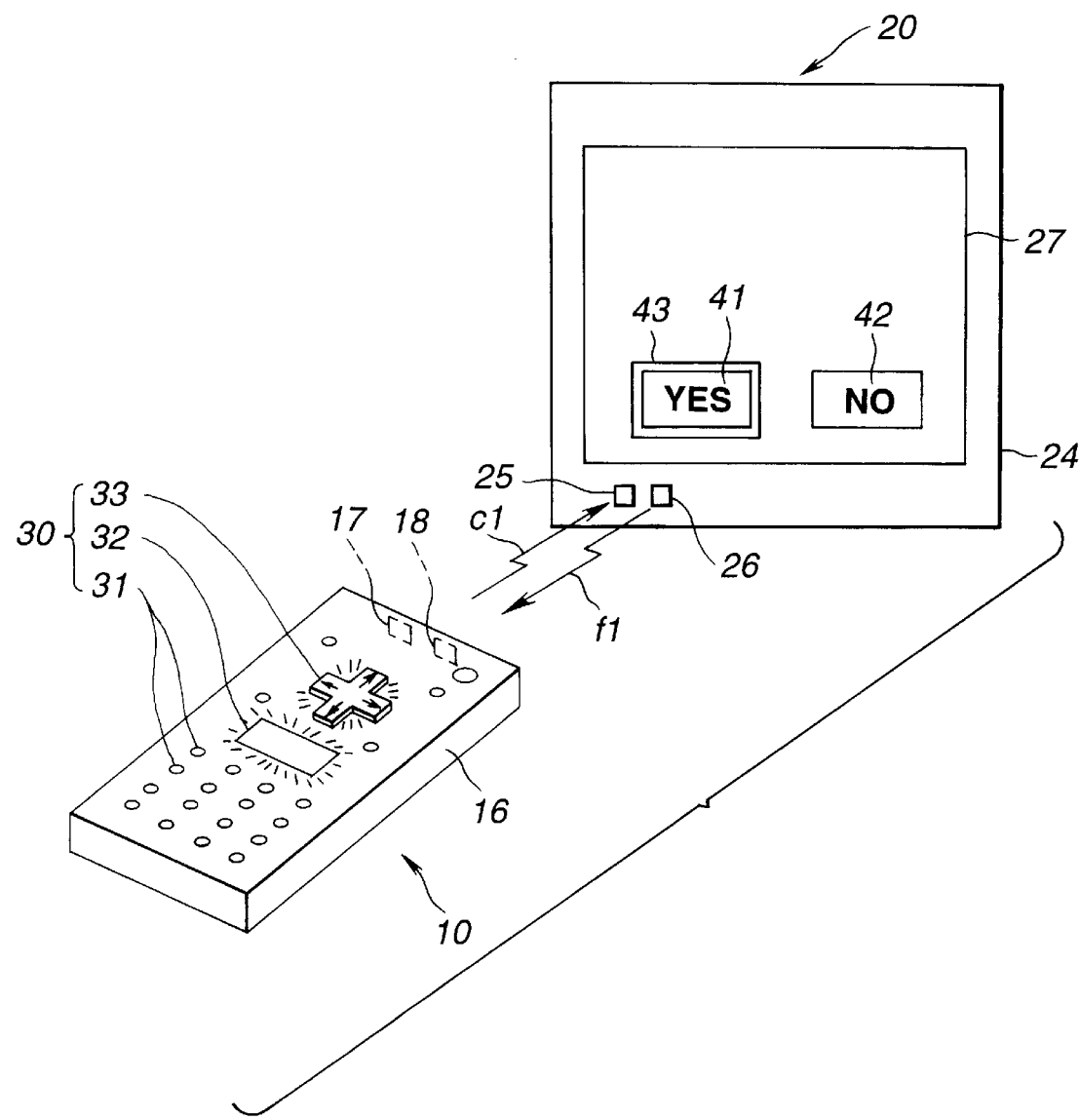
FIG. 2 is a perspective view of the bidirectional remote control apparatus of FIG. 1.

FIG. 2 is a perspective view of the bidirectional remote control apparatus of FIG. 1.

In FIG. 2, a plurality of operating keys 30 on the input keypad 11 of FIG. 1, such as character/symbol keys 31, an enter key 32, and a cursor key 33, are installed on the casing 16 of the remote control transmitter 10.

A light emitting part 17 which is a part of the transmitter 13 of FIG. 1 and a light receiving part 18 which is a part of the receiver 14 of FIG. 1 are installed at one end of the casing 16 of the remote control transmitter 10.

The controlled equipment 20 is an interactive TV receiver, for example. Such receiver is provided with a light receiving part 25 which is a component of the receiver 21 of FIG. 1 and a light emitting part 26 which is a component of the transmitter 23 of FIG. 1 at the lower part of the cabinet 24. The infrared control signal c1 from the light emitting part 17 of the remote control transmitter 10 is received by the light receiving part 25 of the controlled equipment 20. The infrared operating key information signal f1 from the light emitting part 26 of the controlled equipment 20 is received by the light receiving part 18 of the remote control transmitter 10.

An image corresponding to the control of the control signal c1 is displayed on the screen 27 of the controlled equipment 20.

The operation of an embodiment of the present invention will be described below with reference to FIGS. 1 and 2.

FIG. 2 is a TV receiver which can exchange communication between a transmitter and a receiver in two directions. In this Figure, when a quiz program is being broadcast from a TV broadcasting station and it is required for a TV viewer to send his answer "YES" or "NO" to the TV broadcasting station in response to the quiz question, he can do so by pressing the cursor key 33 on the remote control transmitter 10.

In this case, to send an "YES" answer, he presses the left arrow key (← key) of the cursor key 33 and then, enter key 32. To send a "NO" answer, he presses the right arrow key (→ key) of the curser key 33, and then, enter key 32. The cursor key 33 is used for selecting "YES" or "NO", and then, the enter key 32 is used for final decision. That is, the keys to be pressed are the operating key 33, and then, the enter key 32. Under this condition, the CPU 22 (see FIG. 1) of the controlled equipment 20 drives the corresponding circuit in the controlled part 28 to display an image of "YES" 41 or an image of "NO" 42 on the screen 27 (see FIG. 2). At the same time, a frame 43 is placed around the image of "YES" 41 additionally to indicate that "YES" is conditionally selected.

The CPU 22 of the controlled equipment 20 generates an operating key information signal e1 to indicate the operating keys (in this case, the enter key 32 and the cursor key 33 in FIG. 2) to be pressed from among the plurality of operating keys 30 in the mode the controlled equipment is currently set. A signal e1 is sent from the CPU 22 to the transmitter 23. The transmitter 23 converts such signal e1 into the infrared operating key information signal f1 and sends it to the remote control transmitter 10. The remote control transmitter 10 lights the LED(s) of the operating keys indicated by the received operating key information signal f1 by an LED drive means 15. Thus, only the enter key 32 of a plurality of operating keys 30 and the cursor key 33 are lit. Therefore, the operator can confirm that the keys to be pressed are the enter key 32 and the cursor key 33.

To select "YES" in the state shown in FIG. 2, the operator presses the enter key 32. By so doing, the controlled equipment 20 selects "YES" and operates accordingly. In the case of a quiz program, an "YES" answer is sent to a TV broadcasting station as a quiz response through a telephone line.

To select "NO" in the state shown in FIG. 2, the operator presses the (right arrow → key) of the cursor key 33. By so doing, the controlled equipment 20 selects "NO" preliminarily, and a frame 43 is placed around the image of "NO" 42 additionally to indicate that "NO" is conditionally selected. If the operator presses the enter key 32, the controlled equipment 20 selects "NO" and operates accordingly. In the case of a quiz program, a "NO" answer is sent to the TV broadcasting station as a quiz response through the telephone line.

In the above-mentioned configuration, the transmitter 23 of the controlled equipment 20 transmits an operating key information signal f1 indicating the keys to be pressed from among a plurality of operating keys 30 in the mode the controlled equipment is currently set. The receiver 14, the CPU 12, and the LED driver 15 only light the LED(s) of the operating keys indicated by the operating key information signal f1. Therefore, the operator can confirm the operating keys to be pressed, so the operability of the remote control transmitter 10 can be improved.

In an embodiment according to the present invention shown in FIG. 1, the infrared ray is used as a transmission medium to send the control signal e1 from the remote control transmitter 10 to the controlled equipment 20, and to send the operating key information signal f1 from the controlled equipment 20 to the remote transmitter 10. However, the present invention can use various transmission media, such as an electromagnetic wave whose frequency is lower than the infrared ray and a supersonic wave. The present invention can be applied to various controlled equipment, such as an intertext receiver and a multimedia apparatus.

As described above, the bidirectional remote control apparatus according to the present invention comprises controlled equipment and a remote control transmitter for remotely controlling the controlled equipment and has an advantage that the keys to be pressed can be easily confirmed from a plurality of operating keys and the operability of the remote control transmitter can be improved.

An intertext broadcasting system including an interactive TV receiver as controlled equipment will be described below.

The intertext broadcasting system is one of TV multiplex broadcasting systems in which the following data is multiplex-broadcast in the vertical interval of TV broadcasting according to the contents of a TV program: data including additional information, such as the detailed content of TV programs and superimposed dialogue to be displayed according to the content of such a TV program, and data to be displayed on a TV receiver, such as displaying data required for a viewer-participating interactive TV program such as a quiz program.

In the intertext broadcasting, computer program data (sometimes called script data) is transmitted in the vertical interval of the TV broadcasting from a TV broadcasting station. A TV receiver contains a program executor for executing such a computer program. In accordance with such a computer program, the TV receiver displays pictures and characters on the TV screen. When a TV viewer enters some data through an operator, such as the remote control transmitter, the program executor dials a telephone automatically through a communication controller to transmit the data automatically.

Figure 3:
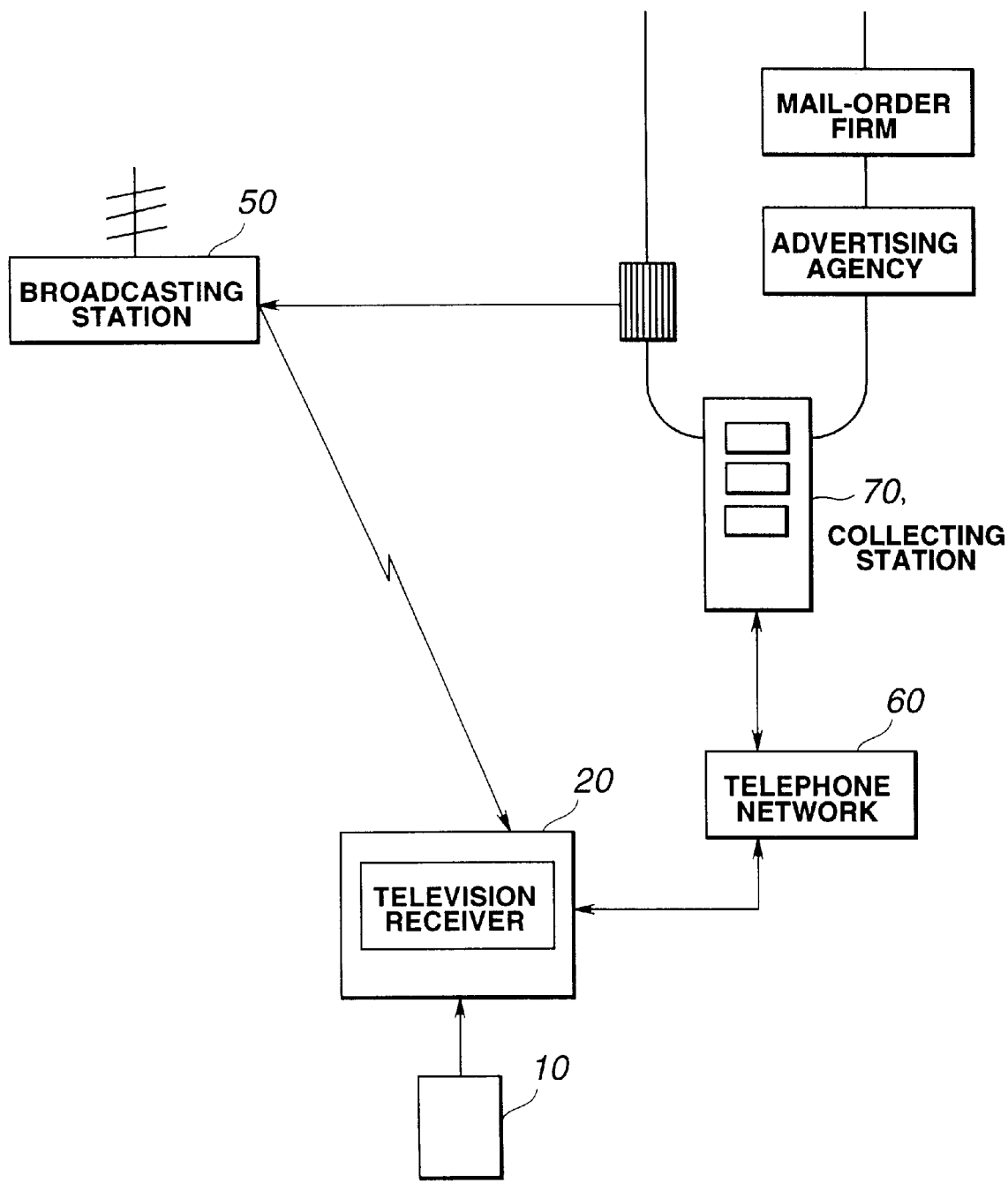
FIG. 3 is a block diagram of a general type of an intertext broadcasting system.

FIG. 3 is a block diagram of a general type of the intertext broadcasting system. This intertext broadcasting system is a network including a TV receiver as controlled equipment 20, a broadcasting station 50, a telephone line network 60, and a collecting station 70. The broadcasting station 50 broadcasts script data required for bidirectional communication as an intertext program through a character broadcasting channel, synchronized with a usual TV program. The broadcasting station also transmits such script data as an independent program repeatedly within a predetermined period. The script data is a kind of an application program stating the proceeding procedure of a bidirectional communication system. It is transmitted by being superimposed in the vertical interval of the TV broadcasting signal.

The script data is stored in a memory of a TV receiver 20 which received the TV broadcasting signal, and executed, for example, by a program executing device (a script decoder) incorporated in the TV receiver 20. This script decoder displays a symbol mark "i" to inform the TV viewer of that the present program is a bidirectional program. Such a decoder also starts the execution of the script data according to an input from a TV viewer through the remote control transmitter or the like, and displays a program catch information as a response.

In some cases, a response on the bidirectional program may terminate in a TV receiver 20. However, when necessary, it is possible to send the results of such response to a computer system (the collecting station 70) in each district through the telephone line network 60, If necessary, it is also possible to reflect such results to a program broadcast by the broadcasting station 50 in real time.

The TV receiver 20 is equipped with a script decoder and a modem to achieve bidiretional function, in addition to a usual TV broadcast receiving part including a TV broadcast receiver/detector, a video signal processor, a demodulator to an RGB signal, and a character multiple decoder. The script decoder achieves bidirectional communication by picking up script data from the detected TV broadcast signal sent from the broadcasting station 50 and executing such script data. The user operates the remote control transmitter 10 for TV remote control to give an answer by sending, data to the broadcasting station. When such data is transmitted to the collecting station 70, its telephone number is automatically dialed by a modem connected with the TV receiver 20 and connected to the collecting station 70.

The modem for the TV receiver 20 has an automatic dialing function so that the viewer does not need to dial the telephone number required to transmit data to the broadcasting station. The telephone number to be automatically dialed is contained in the script data of each bidirectional data multiple program from the broadcasting station 50.

The script decoder is realized by a process or for executing the computer program (script).

The broadcasting station 50 adds script data to a usual TV program on the TV broadcast electric wave for broadcasting. The script data to be added is roughly classified as produced by the broadcasting station itself, and produced and sponsored by the third party, such as advertising agents and mail-order firms. The script data produced by the broadcasting station is further classified as prepared beforehand, and inserted line such as during a sports program broadcast.

When the script data is executed, first, screen components, such as background and operating buttons, are displayed on the TV receiver screen. When a viewer selects an operating button on the screen by using the operating key of the remote control transmitter 10, a program corresponding to such button is started.

A response data processing procedure is preliminarily registered in the collecting station 70. The collecting station redistributes the collected data to the broadcasting station 50, the advertising agents, sponsors, mail-order firms, etc., according to such procedure.

The present invention is very useful because the TV viewer can easily confirm the key(s) to be pressed for the present operator to reply to a bidirectional program in the above-mentioned bidirectional communication system.

The present invention is not limited to the embodiments described above.

The present invention can be changed and modified variously without departing from the spirit and the scope of its appended claims.

What is claimed is:

1. A bidirectional remote control apparatus comprising controlled equipment and a remote control transmitter to remotely control said controlled equipment for enabling bidirectional communication between said controlled equipment to be controlled and a remote control transmitter, said apparatus comprising:
   a plurality of operating keys provided on said remote control transmitter;
   a first transmitter element, provided on said remote control transmitter, which generates a control signal for controlling said controlled equipment in response to operation of said plurality of operating keys;
   a second transmitter element, provided on said controlled equipment, which sends an operating key information signal from said controlled equipment to said remote control transmitter, said operating key information signal indicating operable operating keys from among said plurality of operating keys in a mode in which said controlled equipment is currently set; and
   a lighting circuit, provided on said remote control transmitter, which receives said operating key information signal and, in direct response to said operating key information signal, which lights only said operating keys indicated by said operating key information signal from said controlled equipment
   wherein each of at least one controlled equipment sends an operating key information signal specific to said respective at least one controlled equipment.

2. A bidirectional remote control apparatus comprising controlled equipment and a remote control transmitter for remotely controlling said controlled equipment for enabling bidirectional communication between said controlled equipment and a remote control transmitter, wherein said controlled equipment includes a requesting circuit which requests a response from an operator, said apparatus comprising:
   a plurality of operating keys provided on said remote control transmitter;
   a first transmitter circuit, provided on said remote control transmitter, which generates a signal indicating an operator's request for said controlled equipment in response to the operator's operation of said plurality of operating keys;
   a second transmitter circuit, provided on said controlled equipment, which sends an operating key information signal from said controlled equipment to said remote control transmitter, said operating key information signal indicating operating keys required for an operator to respond from among said plurality of operating keys in a mode in which said controlled equipment requests a response from said operator; and
   a reporting circuit, provided on said remote control transmitter, which receives said operating key information signal from said controlled equipment, and, in direct response to said operating key information signal, indicates said operating keys required for an operator to respond,
   wherein each of at least one controlled equipment sends an operating key information signal specific to said respective at least one controlled equipment.

3. A bidirectional remote control apparatus as claimed in claim 2, wherein said reporting circuit is a circuit which lights said operating keys.

4. A bidirectional remote control apparatus as claimed in claim 2, wherein said requesting circuit which requests a response from said operator displays an image for said operator.

5. A bidirectional remote control apparatus as claimed in claim 2, wherein a signal indicating an operator's request for said controlled equipment is a control signal for controlling said controlled equipment or an operator's answer signal.

6. A bidirectional remote control apparatus comprising a television receiver and a remote control transmitter, wherein said television receiver receives a television broadcast signal and displays text requesting a TV viewer's response, and wherein said TV viewer can exchange communication between said TV receiver and said remote control transmitter in two directions by responding via said remote control transmitter to text displayed on said TV receiver, said apparatus comprising:
   a plurality of operating keys provided on said remote control transmitter;
   a first transmitting element, provided on said remote control transmitter, which generates a control signal for controlling said TV receiver, said first transmitting element further generates an answer signal indicating a viewer's response in response to operation of said plurality of operating keys;
   a second transmitting element, provided on said TV receiver, which transmits said key information signal from said TV receiver to said remote control transmitter, while said text is being displayed on said TV receiver and transmits said key information signal indicating operating keys required for said viewer to respond from among said plurality of operating keys; and
   a lighting circuit, provided on said remote control transmitter, which receives said key information signal from said TV receiver, and, in direct response to said key information signal, indicates said operating keys required for said viewer's response.

* * * * *